United States Patent
Polehn et al.

(10) Patent No.: US 10,566,692 B2
(45) Date of Patent: Feb. 18, 2020

(54) OPTICALLY CONTROLLED META-MATERIAL PHASED ARRAY ANTENNA SYSTEM

(71) Applicant: Verizon Patent and Licensing Inc., Arlington, VA (US)

(72) Inventors: Donna L. Polehn, Kirkland, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 445 days.

(21) Appl. No.: 15/419,041

(22) Filed: Jan. 30, 2017

(65) Prior Publication Data

US 2019/0020107 A1    Jan. 17, 2019

(51) Int. Cl.
| | |
|---|---|
| *H01Q 1/52* | (2006.01) |
| *H01Q 21/06* | (2006.01) |
| *H01Q 3/26* | (2006.01) |
| *H04L 5/00* | (2006.01) |
| *H01Q 15/00* | (2006.01) |
| *H01Q 9/04* | (2006.01) |
| *H04B 7/06* | (2006.01) |
| *H01Q 1/24* | (2006.01) |

(52) U.S. Cl.
CPC ........... *H01Q 3/2676* (2013.01); *H01Q 1/523* (2013.01); *H01Q 9/045* (2013.01); *H01Q 9/0442* (2013.01); *H01Q 15/0033* (2013.01); *H01Q 21/065* (2013.01); *H04B 7/0617* (2013.01); *H04L 5/0007* (2013.01); *H01Q 1/246* (2013.01); *H01Q 15/0066* (2013.01); *H04L 5/0023* (2013.01)

(58) Field of Classification Search
CPC .... H04B 7/0617; H01Q 1/523; H01Q 3/2676; H01Q 9/0442; H01Q 9/045; H01Q 15/0033; H01Q 21/00; H01Q 21/065
USPC .......................................................... 342/375
See application file for complete search history.

(56) References Cited

U.S. PATENT DOCUMENTS

| | | | | |
|---|---|---|---|---|
| 4,983,982 A | * | 1/1991 | Roberge | H01Q 3/46 342/376 |
| 5,231,405 A | * | 7/1993 | Riza | H01Q 3/2676 342/158 |
| 5,307,073 A | * | 4/1994 | Riza | G02F 2/002 342/368 |
| 2005/0085267 A1 | * | 4/2005 | Lemson | H04B 7/10 455/562.1 |
| 2016/0248157 A1 | * | 8/2016 | Rao | H01Q 3/2694 |

* cited by examiner

Primary Examiner — Dao L Phan

(57) ABSTRACT

A system includes a phased array antenna. The phased array antenna includes a rear panel that has: a first array of phase shift elements; and a second array of rear antenna elements. The phased array antenna also includes a front panel that has a third array of front antenna elements. Each of the front antenna elements is electrically coupled to a corresponding one of the rear antenna elements through one of the phase shift elements. When the second array of rear antenna elements receives a radio signal from a base station and the first array of phase shift elements receives an optical control beam from the base station, the third array of antenna elements radiates an output radio signal in a direction indicated by the optical control beam.

16 Claims, 12 Drawing Sheets

OPTICALLY CONTROLLED META-MATERIAL PHASED ARRAY ANTENNA SYSTEM

BACKGROUND INFORMATION

In advanced networks like 5G, mobile devices may communicate over channels at high wave frequencies 14 Gigahertz or higher). At these frequencies, however, signals suffer high path loss, particularly for indoor coverage. Accordingly, wireless service providers that implement advanced networks may need to increase cell density, reducing inter-site distances to a range of about 200~300 meters.

For the service providers, increasing cell density means increasing capital and expense budgets, and hence, lower return on investment (ROI). In addition, if advanced cell sites are built like traditional cell sites (e.g., macro and small cells), the service providers are likely to see increased operational expenditure (OPEX) (e.g., tower rent, fiber backhaul maintenance, etc.).

DETAILED DESCRIPTION OF PREFERRED EMBODIMENTS

The following detailed description refers to the accompanying drawings. The same reference numbers in different drawings may identify the same or similar elements.

As used herein, the term "metamaterial" or "meta-material" may refer to a synthetic material designed to have properties not found in nature. For example, a meta-material may include a repeating/recurring structure on its surface, such that electromagnetic waves arriving at the surface may interact with the meta-material. The scale of each of the structures may be on the order of the wavelengths of the received electromagnetic waves.

In the following, an optically controlled meta-material phased array (OCMPA) antenna system includes: a base station; and at least one passive, reconfigurable OCMPA antennas (also herein referred to as "reflector," "reflector antenna," "deflector," or "deflector antenna"). In operation, the base station transmits a signal (e.g., a radio signal) and an optical control beam to one of the OCMPA antennas. The OCMPA antenna relays the signal to the user device. The optical control beam from the base station controls the direction a which the OCMPA antenna steers the signal.

OCMPA antennas can be deployed incrementally, to avoid a large, upfront capital expenditure. An OCMPA antenna uses meta-material technology to dynamically change its antenna characteristics. OCMPA antennas are passive devices that operate in millimeter (mm wave frequencies, and may be constructed to be small and light. This allows OCMPA antennas to be located where traditional cell sites cannot be positioned, as well as reduce rent (e.g., for tower space and weight, for ground space at cell sites). In some embodiments, no fiber is needed to control or send signals to OCMPA antennas.

Figure 1:
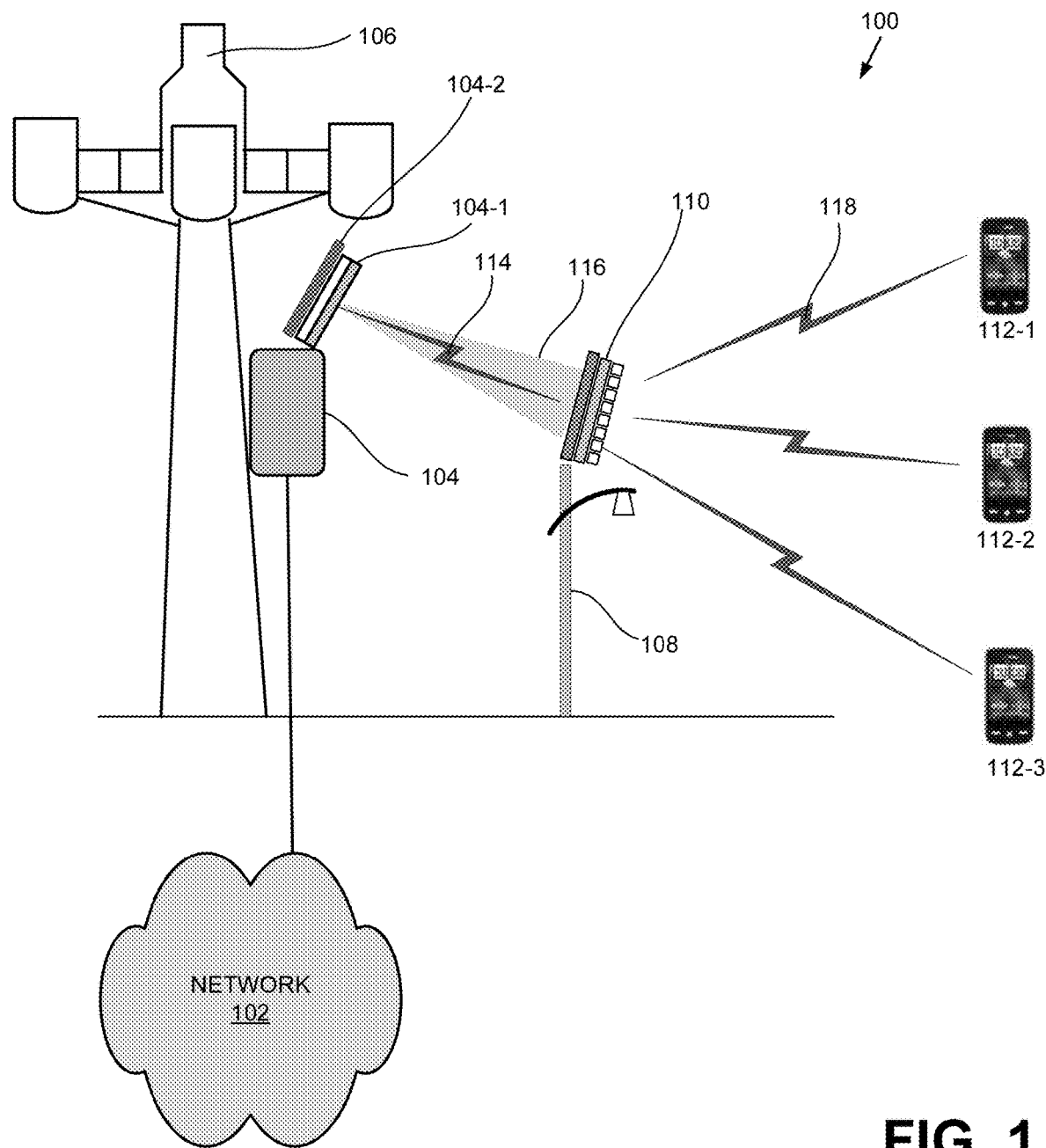
FIG. 1 illustrates an overview of an exemplary environment in which concepts described herein may be implemented.

FIG. 1 illustrates an overview of an exemplary environment 100 in which OCMPA antenna system described herein may be implemented. As shown, environment 100 may include a network 102, a radio mount 106, an OCMPA antenna mount 108, an OCMPA antenna 110, and user devices 112-1, 112-2, and 112-3 (collectively "user devices 112" and generically "user device 112").

Network 102 may include one or more wireless networks of any type, such as, for example, a local area network (LAN), a wide area network (WAN), and a wireless satellite network, and/or one or more wireless public land mobile networks (PLMNs). The PLMN(s) may be a Code Division Multiple Access (CDMA) PLMN, a Global System for Mobile Communications (GSM) PLMN, a Long Term Evolution (LTE) PLMN and/or other types of PLMNs not specifically described herein (e.g., 5G PLMN networks).

Portions of network 102 may support Internet Protocol (IP)-based communications, and may include, for example, an IP Multimedia Subsystem (IMS) network, which may provide voice and multimedia services to user devices 112 based on Session Initiation Protocol (SIP).

As shown, network 102 includes a base station 104, which has an antenna 104-1 and an optical transmitter 104-2. Antenna 104-1 transmits to and receives radio signals from user devices 112 over a wireless communication path that includes OCMPA antenna 110. For example, antenna 104-1 may receive signals from user device 112-1 over wireless communication link 118 and wireless communication link 114 via OCMPA antenna 110. Optical transmitter 104-2 sends optical control signals (e.g., laser beams) to a particular OCMPA antenna. 110 through free space or optical media (e.g., optical fiber). The control signals direct OCMPA antenna 110 to modify the direction of its antenna pattern lobes, and thus, to focus on signals that are received from and/or transmitted in a particular direction (e.g., to user device 112-1). When there are multiple user devices 112 as shown in FIG. 1, the control signals direct OCMPA antenna 110 to steer signal 114 to each of user devices 112 in a time-sliced manner.

Radio mount 106 may include a structure (e.g., a transmission tower) or a place (e.g., the rooftop of a high rise, the top of a hill, etc.) at/on which base station 104 and its components (i.e., antenna 104-1 and optical transmitter 104-2) are mounted. Typically, radio mount 106 may be located at a relatively high elevation, to allow antenna 104-1 and/or optical transmitter 104-2 to have unobstructed views to one or more OCMPA antenna 110.

OCMPA antenna mount 108 includes a structure of a place at which OCMPA antenna 110 may be affixed. In FIG. 1, OCMPA antenna mount 108 is shown as a street lamp post, but in practice, may include any other object or place that is in the appropriate field of view for antenna 104-1.

OCMPA antenna 110 may relay radio frequency (RF) signals (e.g., signal 114) from antenna 104-1 to user devices 112 as signals 118. In relaying the RF signals, OCMPA antenna 110 may direct the main lobe of its antenna pattern to a particular user device 112 in accordance with optical control beam 116 from optical transmitter 104-2. Optical control beam 116 may be conveyed to OCMPA antenna 110 over the air ("free space") or through an optial medium (e.g., an optical fiber).

User device 112 may include an electronic device having communication capabilities. For example, user device 112 may include a cellular radiotelephone, a smart phone, a wearable computer (e.g., a wrist watch, eye glasses, etc.), a tablet, a set-top box (STB), a mobile phone, any type of internet protocol (IP) communications device, a voice over internet protocol (VoIP) device, a laptop computer, a palmtop computer, a gaming device, a media player device, or a digital camera that includes communication capabilities (e.g., wireless communication mechanisms), a thing in the Internet-of-things IoT), etc. In a long-term evolution (LTE)-like environment, user device 112 may be referred to as user equipment (UE).

In FIG. 1, the OCMPA antenna system includes base station 104 and OCMPA antenna 110. When in operation, base station 104 transmits signal 114 and optical control beam 116 to OCMPA antenna 110 in the same time window. OCMPA antenna 110 passively deflects signal 114 to user device 112. Optical control beam 116 controls the phased array antenna driver elements to control the direction at which OCMPA antenna 110 steers signal 114.

As indicated above, OCMPA antenna 110 can be deployed at places where cell density needs to be high. OCMPA antenna 110 is based on meta-material technology to dynamically change its antenna characteristics. OCMPA antenna 110 may be a passive device, and may be constructed to be small and light. Deployment of the OCMPA antenna 110 is easy, as it can be placed in locations where traditional wireless systems cannot be deployed. In the particular embodiment illustrated in FIG. 1, no fiber is needed to control or send signals to OCMPA antenna 110. Additionally and/or alternatively, fiber and other optical components may be used to transmit the optical control signals to antenna 110.

Depending on the implementation, environment 100 may include additional or fewer components than those illustrated in FIG. 1. For example, in a different embodiment, environment 100 may include additional user devices, base stations, fiber interfaces and networks, OCMPA antennas, radio mounts, OCMPA antenna mounts, etc. In addition, objects in FIG. 1 and the relative distances between them are not drawn to scale, and they may be larger, smaller, and/or different in shape than depicted in FIG. 1.

Figure 2:
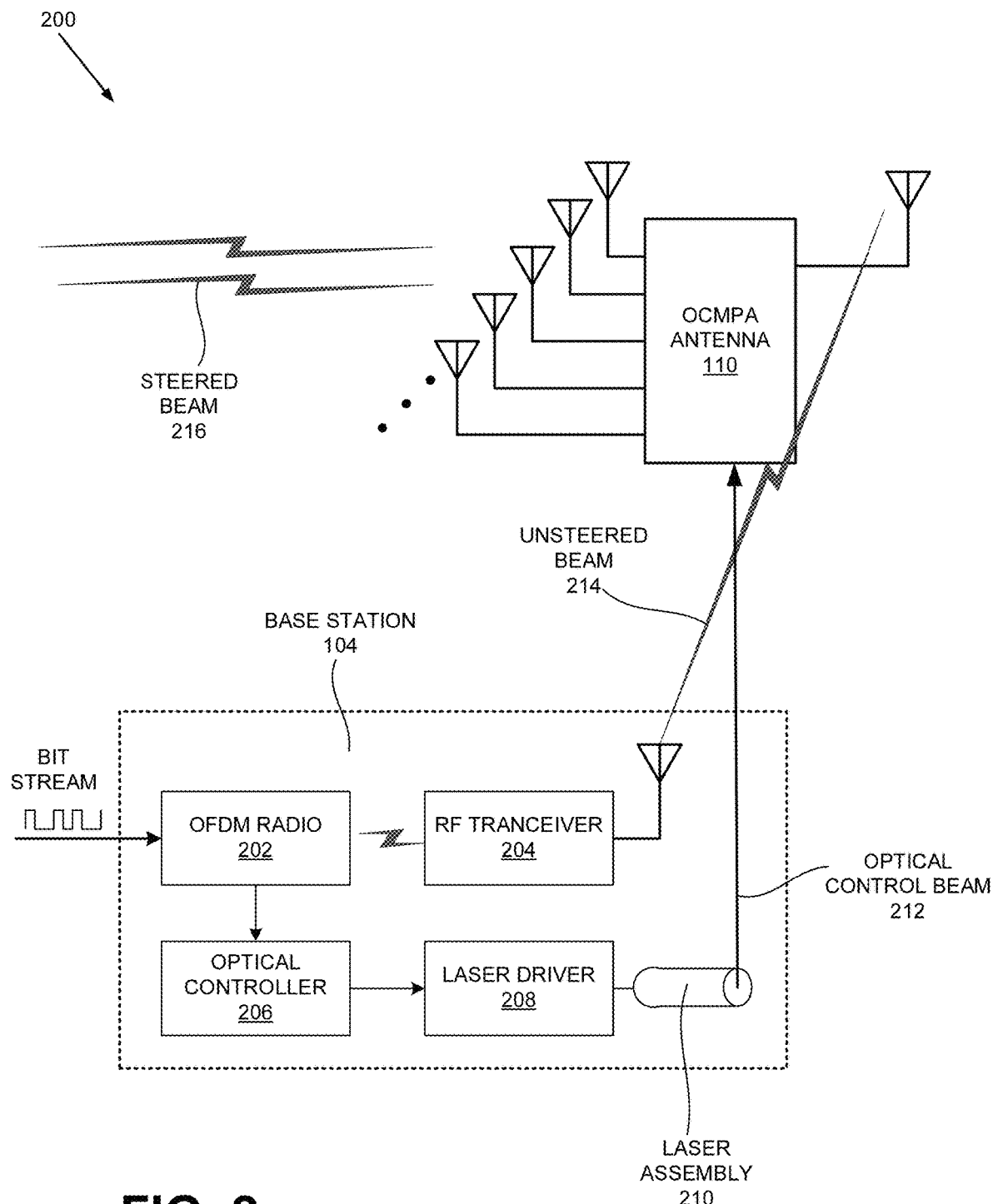
FIG. 2 illustrates an exemplary optically controlled meta-material phased array (OCMPA) antenna system whose components are depicted in FIG. 1.

FIG. 2 illustrates an OCMPA antenna system 200. As shown, OCMPA antenna system 200 includes base station 104 and OCMPA antenna 110, which are also illustrated in FIG. 1. As further shown in FIG. 2, base station 104 may include an Orthogonal Frequency Division Multiplex (OFDM) radio 202 or other type of radio that uses a different modulation scheme (e.g., Code Division Multiple Access (CDMA), OFDM-CDMA, Phase Shift Keying (PSK), Frequency Shift Keying (FSK), Quadrature Amplitude Modulation (QAM), etc.), an RF transceiver 204, an optical controller 206, a laser driver 208, and a laser assembly 210.

OFDM radio 202 may receive a bitstream, process the bitstream for OFDM transmission (e.g., serial-to-parallel conversion, encoding, applying Inverse Discrete Fourier Transform, parallel-to-serial conversion, cyclic prefix insertion, digital-to-analog conversion, modulation, etc.), and transmit OFDM radio signals corresponding to the input bitstream. OFDM radio 202 may transmit the OFDM radio signals to RF transceiver 204. Similarly, OFDM radio 202 may receive an output signal from RF transceiver 204, process the output signal to obtain a received bitstream (i.e., operations that are inverse of the operations performed for transmission), and output the received bitstream.

In addition to transmitting/receiving OFDM signals, OFDM radio 202 may send signals to optical controller 206. In one implementation, the signals may provide information for beam steering (e.g., directions to steer a beam to achieve greater signal strength, information to identify an OCMPA antenna to steer RF signals, etc.).

RF transceiver 204 may receive OFDM radio signals from OFDM radio 202, demodulate and/or modulate the received signal at the desired carrier frequency (e.g., a 5G frequency), and transmit the modulated signal as an unsteered beam 214 to OCMPA antenna 110.

Optical controller 206 may receive, from OFDM radio 202, signals that include information for identifying an OCMPA antenna 110 to steer its beam to a particular user device 112. Based on the received signals from OFDM radio 202, optical controller 206 may determine a direction to steer beam 216. In some implementations, the signals may carry information that can be used determine the location of user device 112. Based on the location, optical controller 206 may identify a particular OCMPA antenna 110 that is to steer beam 216 to the particular user device 112, as well as a desired direction of OCMPA antenna 110 beam.

Based on the identity of OCMPA antenna 110 and the desired direction of the OCMPA antenna beam, optical controller 206 may apply laser driver 208 to control laser assembly 210. More specifically, optical controller 206 may direct the output of laser assembly 210 to the identified OCMPA antenna 110 and set the direction of OCMPA antenna beam through optical control beam 212.

Laser driver 208 may drive laser assembly 210 to direct optical control beam 212 to a particular OCMPA antenna 110 and/or to modulate the output power of laser assembly 210, such that optical control beam 212 causes the identified/selected OCMPA antenna 110's main lobe (of its antenna gain) to be directed at the user device 112.

Laser assembly 210 may receive the drive signals from laser driver 208. The drive signals may identify the particular OCMPA antenna 110 to receive optical control beam 212, and may include directional information for steering an OCMPA antenna beam 216. Laser assembly 210 generates and transmits optical control beam 212 to OCMPA antenna 110, in one embodiment, optical control beam 212 may be composed of individual laser beams whose intensities vary across the cross-section of beam 212. The varying intensities of the individual laser beams indicate, to OCMPA antenna 110, the direction to which beam 116 is to be steered. In a different embodiment, laser assembly 210 may not be part of base station 104 and may be external to base station 104.

In some implementations, laser assembly 210 may include multiple laser output ports, each of which corresponds to a particular OCMPA antenna 110. Based on the drive signal, laser assembly 210 may select the output port corresponding to the identified OCMPA antenna 110. In other implementations, laser assembly 210 may include mechanical and/or electronic mechanisms for directing optical control beam 212 to the identified/selected OCMPA antenna 110, over the air or through an optical medium.

OCMPA antenna 110 receives optical control beam 212 from laser assembly 210 and performs beam steering in accordance with the direction information provided in optical control beam 212. That is, OCMPA antenna 110 deflects a received RF beam from base station 104 in accordance with intensities of individual laser beams that comprise optical control beam 212. OCMPA antenna 110 deflects the RF signal to a target user device 112.

Depending on the implementation, base station 104 and/or OCMPA antenna 110 may include additional, fewer, different, and/or a different arrangement of components than those illustrated in FIG. 2. For example, in one implementation, OFDM radio 202 may include a modulator that directly transmits the OFDM signals to OCMPA antenna 110 at the desired frequencies. In such an implementation, base station 104 may not include RF transceiver 204 as a separate component.

Figure 3:
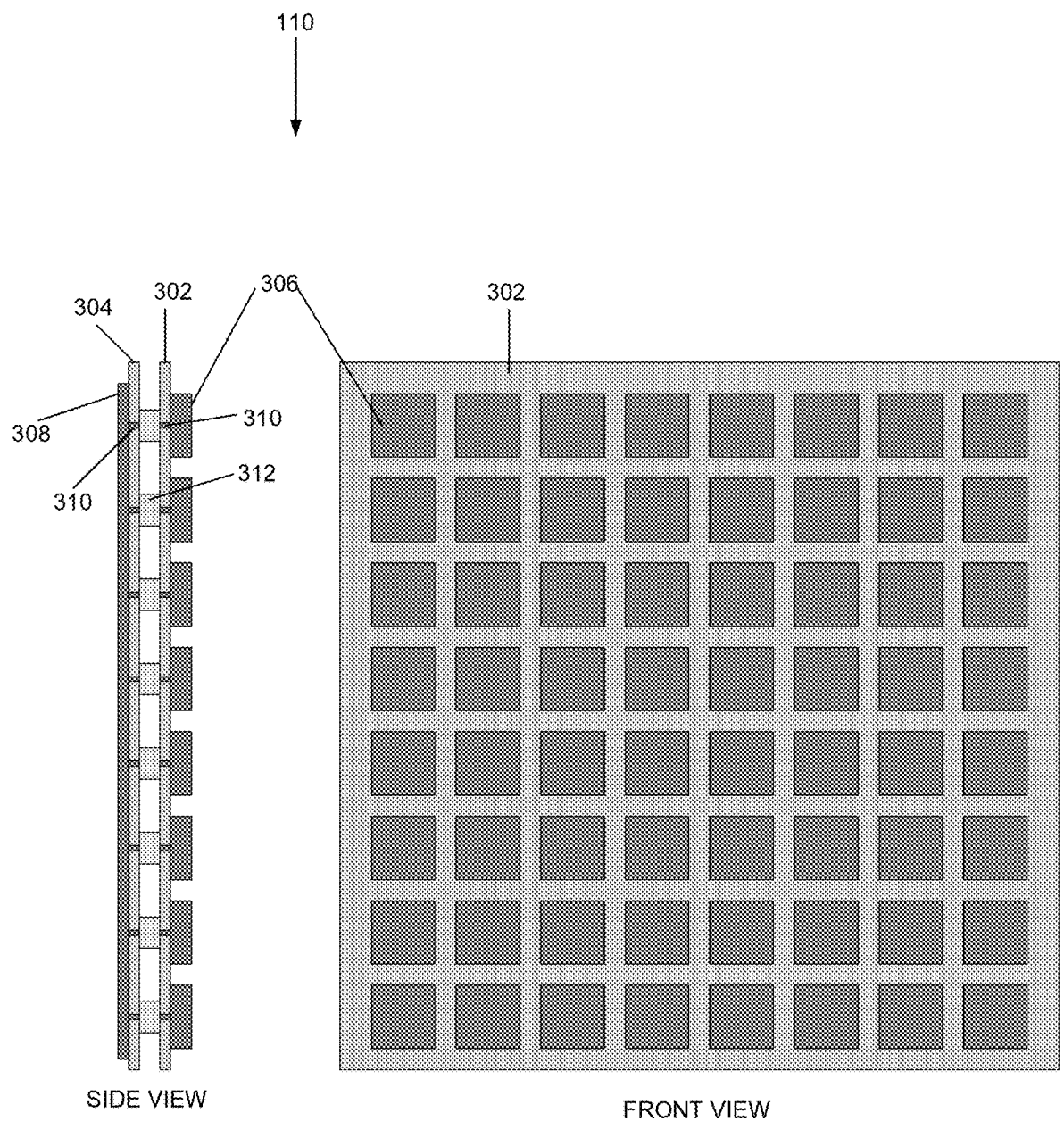
FIG. 3 illustrates exemplary components of an exemplary OCMPA antenna of FIGS. 1 and 2.

FIG. 3 illustrates exemplary components of OCMPA antenna 110. As shown, OCMPA antenna 110 may include a front panel 302 (e.g., printed circuit board (PCB)), a rear panel 304 (e.g., a PCB), front antenna elements 306 (e.g., copper patch elements), rear antenna elements 308 (e.g., copper patch elements), vias 310, and electronic filter elements 312. Depending on the implementation, OCMPA antenna 110 may include fewer, additional, different, or a differently arrangement of components than those illustrated in FIG. 3. For example, the relative sizes of components 302-312 may be different from those illustrated in FIG. 3 (e.g., antenna elements with larger surface area, greater of smaller distances between antenna elements, etc.). In another example, OCMPA antenna 110 may include additional antenna elements.

The array of front antenna elements 306 is similar or identical to rear antenna elements 308, although not illustrated in FIG. 3. Rear panel 304 receives RF signals from base station 104 and passes the received signals to front panel 302.

As shown, front and rear panels 302 and 304 provide electrically insulating bodies for mounting front and corresponding rear antenna elements 306 and 308 as a two-dimensional array. Each of front and rear antenna elements 306 and 308 is capable of both transmission and reception of radio signals.

Each front antenna element 306 makes an electrical contact to a corresponding electronic filter element 312 through vias 310, and a corresponding rear antenna element 308 makes an electrical contact to the same electronic filter element 312 through vias 310. Thus, front and its corresponding rear antenna elements 306 and 308 are electrically coupled, but through filter element 312, each of which functions as a phase shifting element (or "phase shifter"). In this configuration, RF signals at the front antenna element 306 and the corresponding rear antenna element 308 differ by a phase angle corresponding to a delay associated with filter element 312. Phase shifters 312 facilitate the steering of the output beam, and are controlled by optical control beam 212.

Each filter element 312 is capable of having its own state independently from other filter elements 312. Accordingly, if two rear copper patch elements 308 receive an RF signal from base station 104, and if those two rear antenna elements 308 are coupled to respective filter elements 312 with different states, the output signal values at the two corresponding front antenna elements 306 would have different phase shifts. That is, each filter element 312 serves as an independent phase delay element.

The distance between adjacent antenna elements 306/308 may be approximately on the order of or less than the wavelength corresponding to frequencies at which OCMPA antenna 110 operates (e.g., >14 GHz, <14 GHz, between 1.8 and 2.5 GHz, between 2 to 8 GHz, etc. The dimension of the OCMPA antenna 110 may be approximately in the order of the wavelength times the number of antenna elements, although other sizes are possible depending on the required spaces for other components of OCMPA antenna 110 which may render OCMPA antenna 110 be of any size.

Figure 4A:
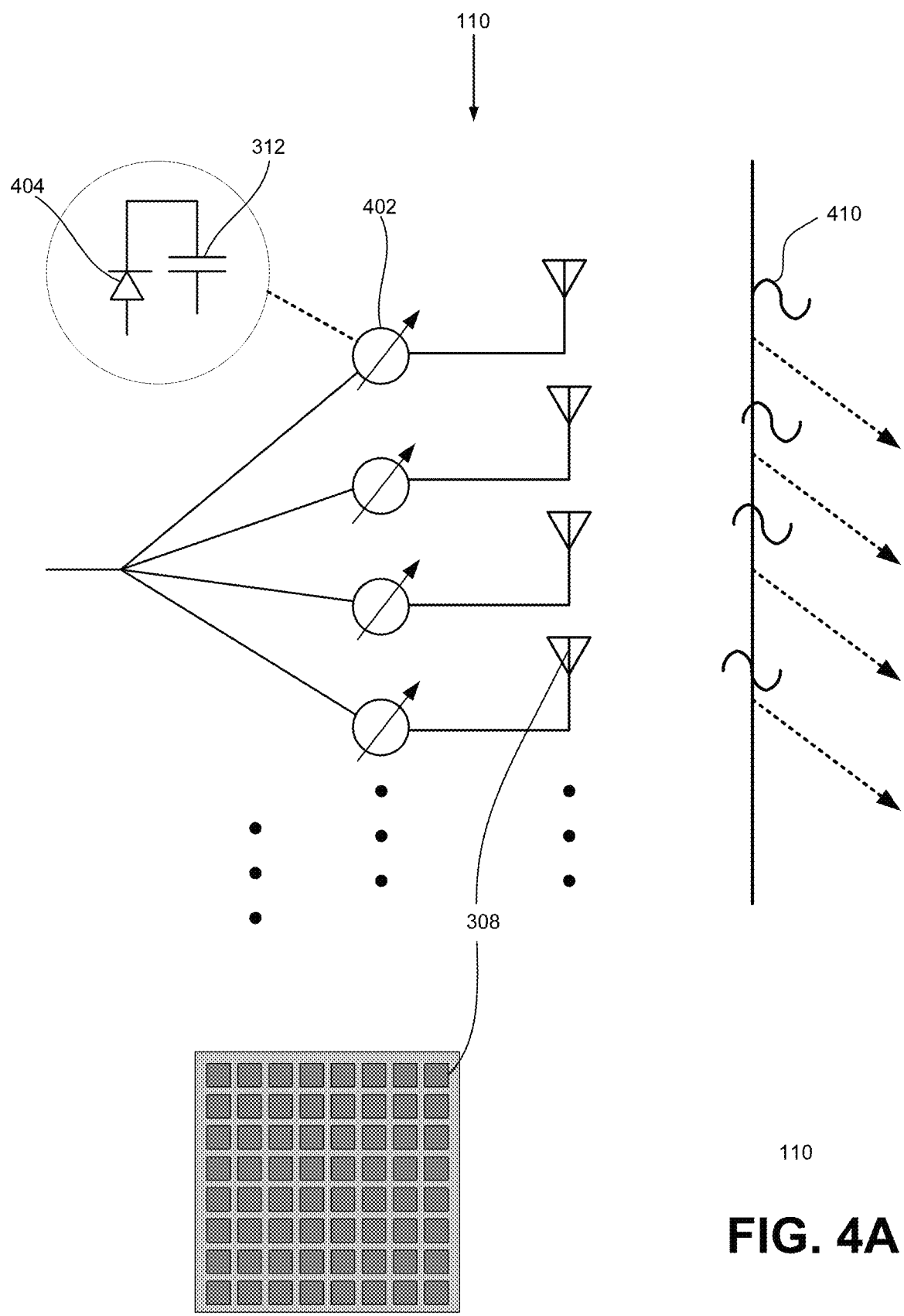
FIG. 4A is a functional diagram of exemplary phase delay elements of the OCMPA antenna of FIGS. 1-3.

FIG. 4A is a functional diagram of phase delay elements 402 of OCMPA antenna 110. As shown, phase delay element 402 includes a filter element 312 (illustrated as a capacitor, although other filter elements are possible) and a photodiode 404. Each filter element 312 is controlled by a corresponding photodiode 404. When photodiode 404 receives optical control signal 212, photodiode 404 provides a path to ground for filter element 312, causing a phase shift between a signal arriving at rear panel 304 and the signal output at front panel 302.

In FIG. 4A, if delay elements 402 are arranged as a linear array, a signal 410 through one filter element 312 is phase shifted relative to a signal 410 through a prior filter element 312. If the difference in phase angle between one element and an immediately prior element is denoted Z, then Z determines the angle by which the main lobe of OCMPA antenna pattern is directed or steered. Accordingly, by controlling Z, an RF beam arriving at the rear of phased array antenna 110 can be steered to a particular user device 112.

Given a two dimensional array of antenna elements, as illustrated in FIG. 3, the phase delays between the elements occur in X and/or Y direction, and accordingly, the beam can be directed in both X and Y directions.

If an optical signal impinges evenly on the surface of rear panel 304 (with antenna elements 308), the output RF signal on front panel 302 will have a deflection angle of zero. If more optical energy is placed on some portions of rear panel 304 and less on the other portions, the output RF beam emerging from front panel 302 will have a deflection angle proportional to the difference in the optical energy. The differences in optical energy produces varying capacitance through photodiode 404-controlled filter elements 312 and thus varying phase shifts on the RF output side (i.e., front panel 302).

Figure 4B:
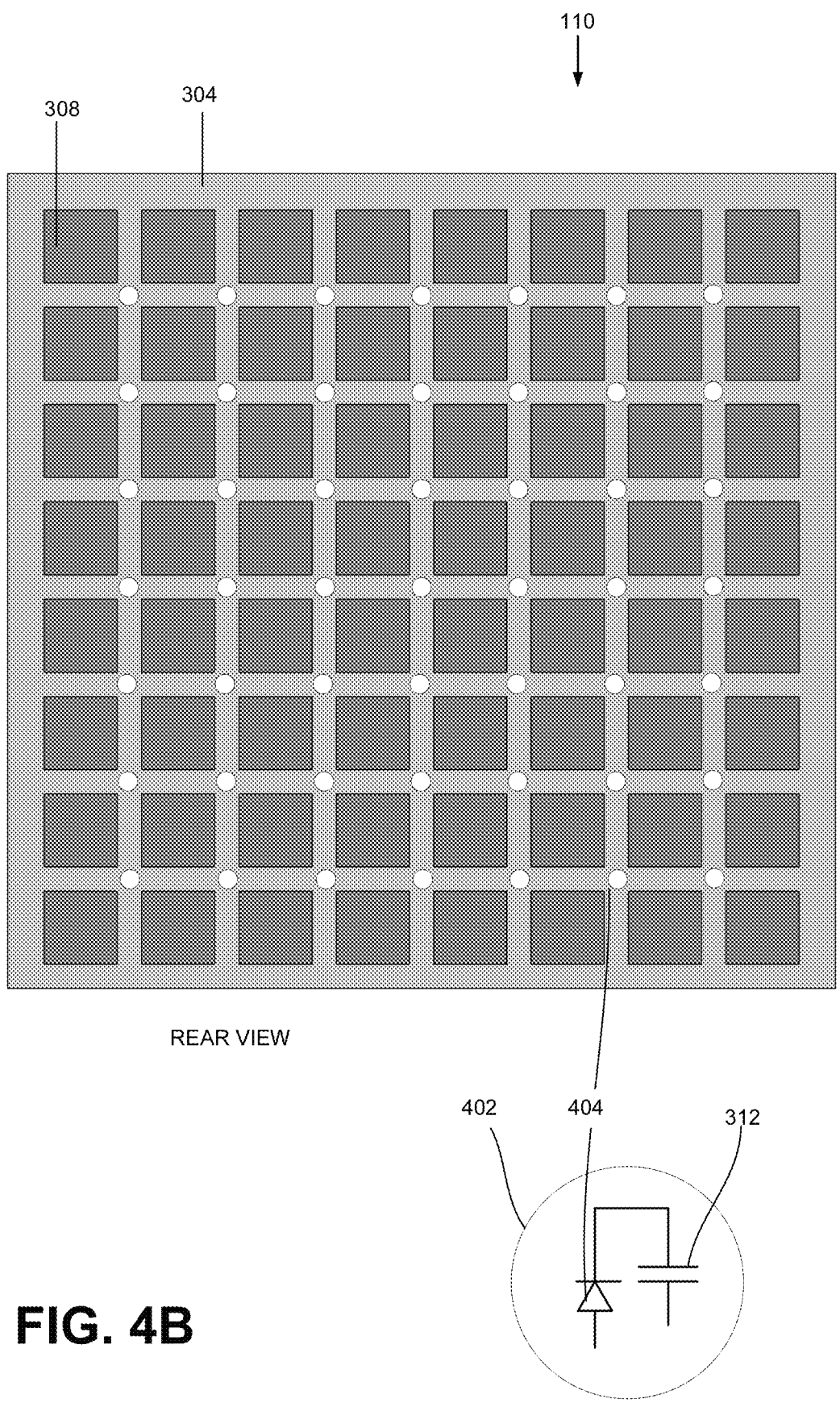
FIGS. 4B and 4C illustrate exemplary positions of photodiodes of FIG. 4A.
Figure 4C:
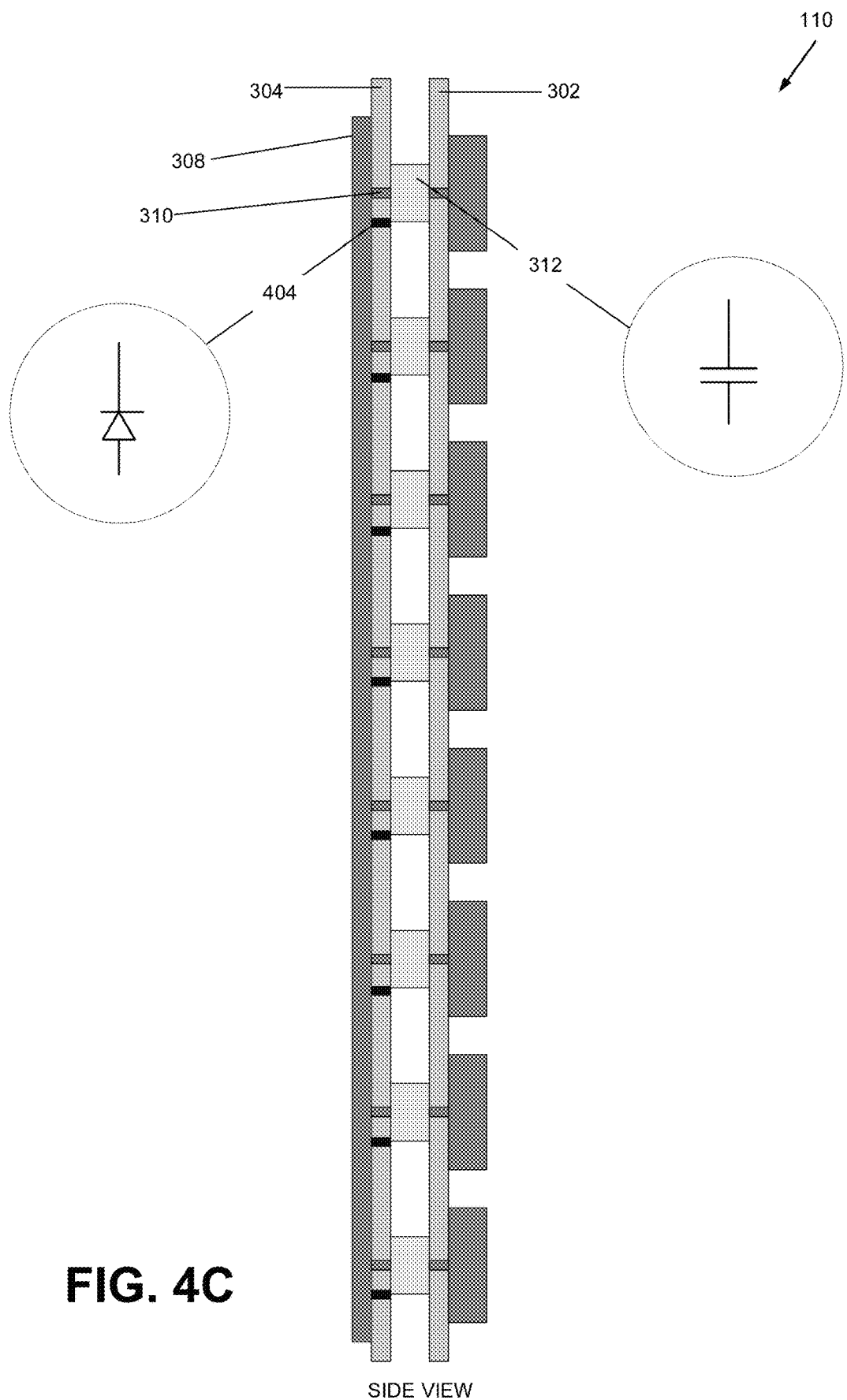

FIGS. 4B and 4C illustrate exemplary positions of photodiodes 404 on rear panel 304. According to one embodiment shown in FIG. 4B, each of photodiodes 404 is positioned between adjacent rear antenna elements 308. According to another embodiment in FIG. 4C, each photodiode 404 is coupled to filter element/capacitor 312. In some implementations, photodiode-capacitor pairs (i.e., phase delay elements 402) can be fabricated with an exposed optical area on a single silicon die rather than with two separate components.

FIGS. 5A-5D illustrate distributions of optical energy over the surface (shown in FIG. 4B) of rear panel 304 of OCMPA antenna 110. As illustrated, it is possible to "paint" the surface with various power patterns to direct the antenna beam in specific ways.

In FIGS. 5A-5D, if more optical energy is applied to a particular area, quadrant, portion or region of the surface, more photodiodes 404 in the area are activated, which in turn leads to greater capacitance in photo-diode capacitor pairs 402 in the area, quadrant, portion or region. Increased phase shifts at front and rear antenna elements cause an outgoing RF beam (on front panel 302 of OCMPA antenna 110) to be controlled and steered in the desired direction.

Figure 5A:
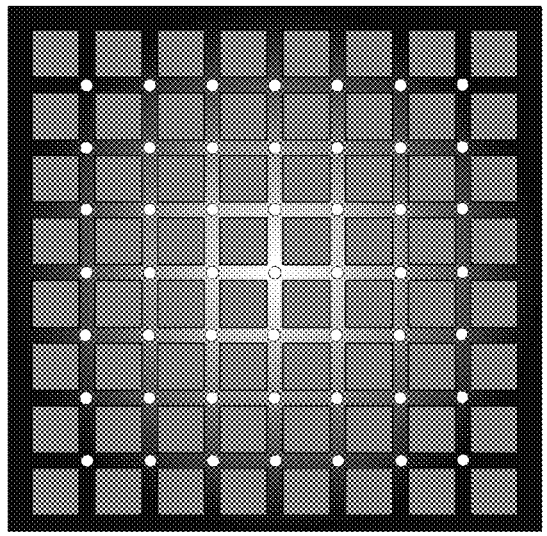
FIGS. 5A-5D illustrate distributions of optical energy over the rear surface of a. OCMPA antenna of FIGS. 1-3 and 4A-4C.

For example, FIG. 5A shows optical control beam 212 impinging on the center of the rear surface of OCMPA antenna 110, as indicated by the brighter area. In this case, the output RF beam (i.e., the main lobe of its gain pattern)

from the front surface of OCMPA antenna does not change its direction—no beam steering occurs.

Figure 5B:
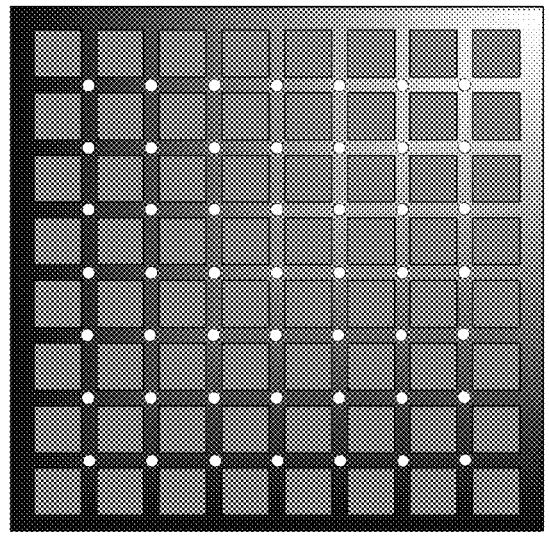
Figure 5C:
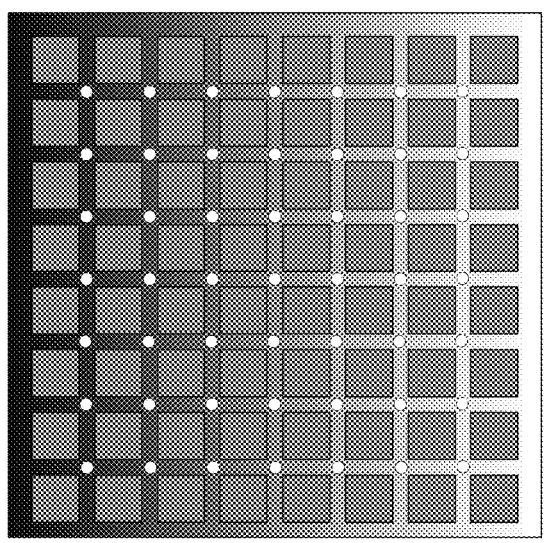
Figure 5D:
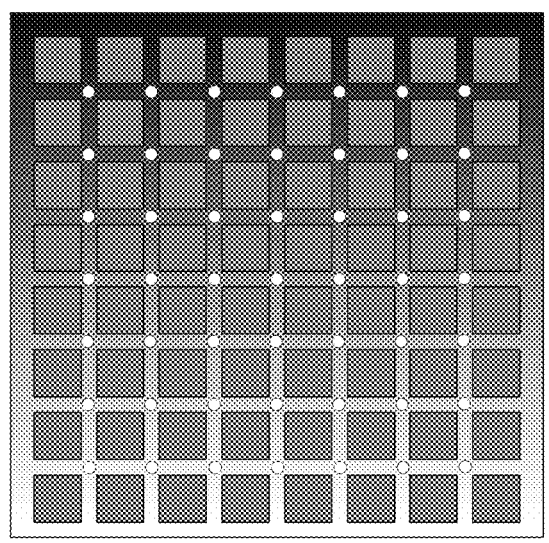

FIG. 5B illustrates optical control beam 112 delivering most of its energy to the upper right corner of the rear surface of OCMPA antenna 110, as indicated by the brighter area. The output RF beam is steered toward the upper right corner, for example, which is the upper left corner from the front view). As will be understood, depending on the characteristics of filter elements 402 different or alternative beam patterns may be achieved. FIGS. 5C and 5D depict optical control beam 112 delivering most energy to, respectively, the right side of and the bottom of the rear surface of OCMPA antenna 110. In response, the beam is steered, respectively, in the desired directions.

Figure 6:
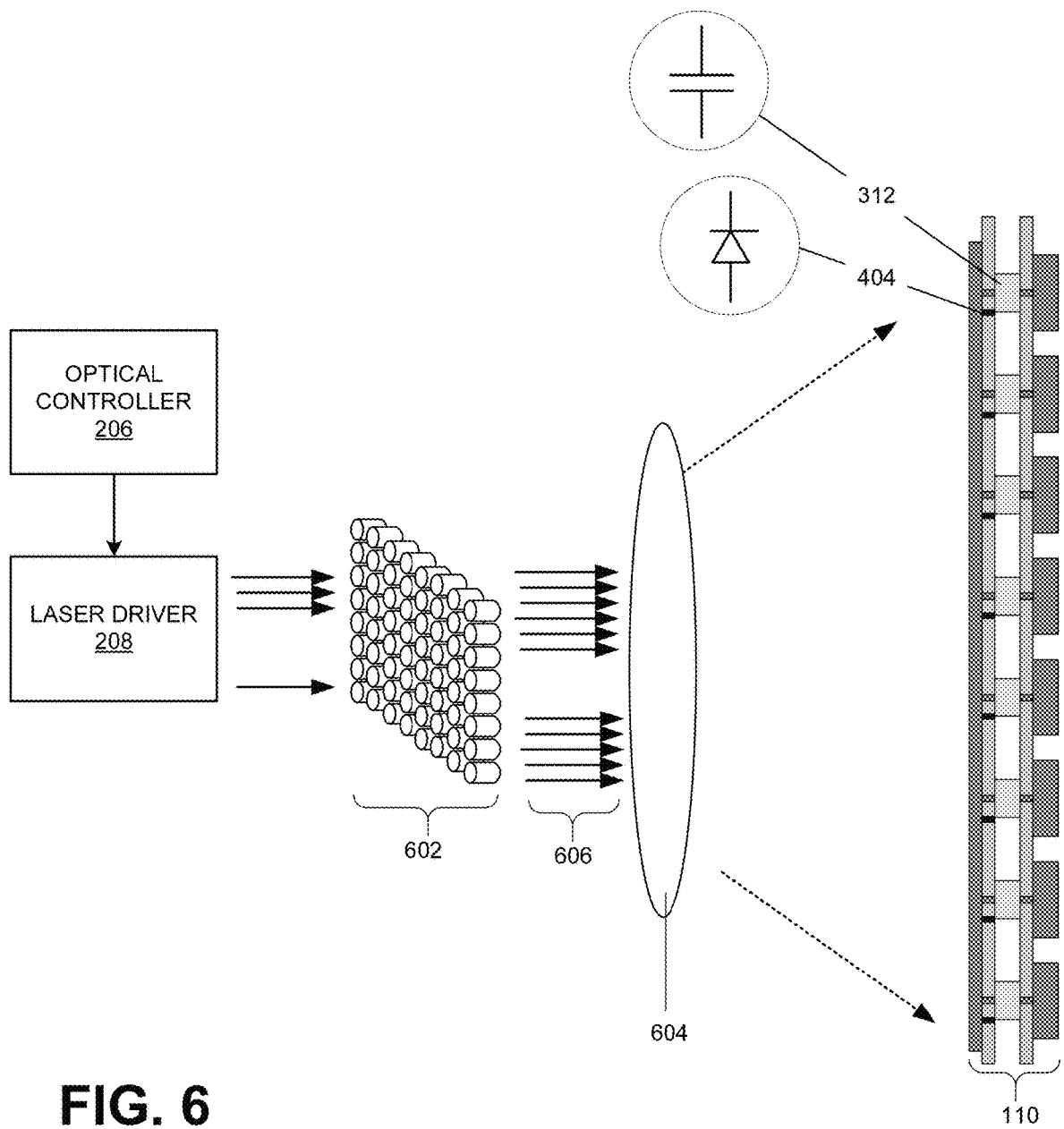
FIG. 6 illustrates exemplary optical components of the OCMPA antenna system of FIG. 2.

FIG. 6 illustrates exemplary optical components of the OCMPA antenna system 200. As shown, optical components may include a laser array 602 and one or more lens 604.

Each laser in laser array 602 is individually controlled and can be switched on and off at a high speed. By switching on or off different groupings of lasers in array 602, optical controller 206 may cause laser array 602 to generate optical patterns similar to those illustrated in FIGS. 5A-5D. Laser driver 208 may provide the correct drive current/voltage to each of the lasers to control optical signals.

Lens 604 focuses laser beams 606 from laser assembly 210, to direct the beams to the rear surface of a selected OCMPA antenna 110.

Depending on the implementation, OCMPA antenna system 200 may include additional, fewer, different or a different arrangement of optical and control components than those illustrated in FIG. 6. For example, in one embodiment, system 200 may include components such as mirrors, optical splitter, multiplexer, demultiplexer, gratings, etc. In another embodiment, OCMPA antenna system 200 may include mechanical/electronic mechanisms for directing optical control beam 112 to a particular OCMPA antenna 110.

In another embodiment, an optical fiber may deliver optical control beam 212 from laser array 602 to OCMPA antenna 110. Han optical fiber is used, it is possible to combine the laser output signals (each at a different frequency) through wave division multiplexing (WDM) techniques, to form a single optical control beam. When the optical control beam arrives at OCMPA antenna 110, the beam is demultiplexed into multiple beams, each of which controls an optical delay element. Additionally and or alternatively, laser beams 606 and lens 604 may be used to distribute optical control beam 112 to control delay elements 402.

Referring back to FIG. 1, base station 104 is shown as communicating with multiple user devices 112. This illustrates a simple use case, for OCMPA antenna system 200, in which base station 104 time slices its communication with each device 112. Each time base station 1104 selects a user device 112 for communication, base station 104 directs a particular OCMPA antenna 110 to steer its beam at user device 112. While the beam is thus directed, base station 104 provides wireless communication path to user device 112 for a time interval.

Figure 7:
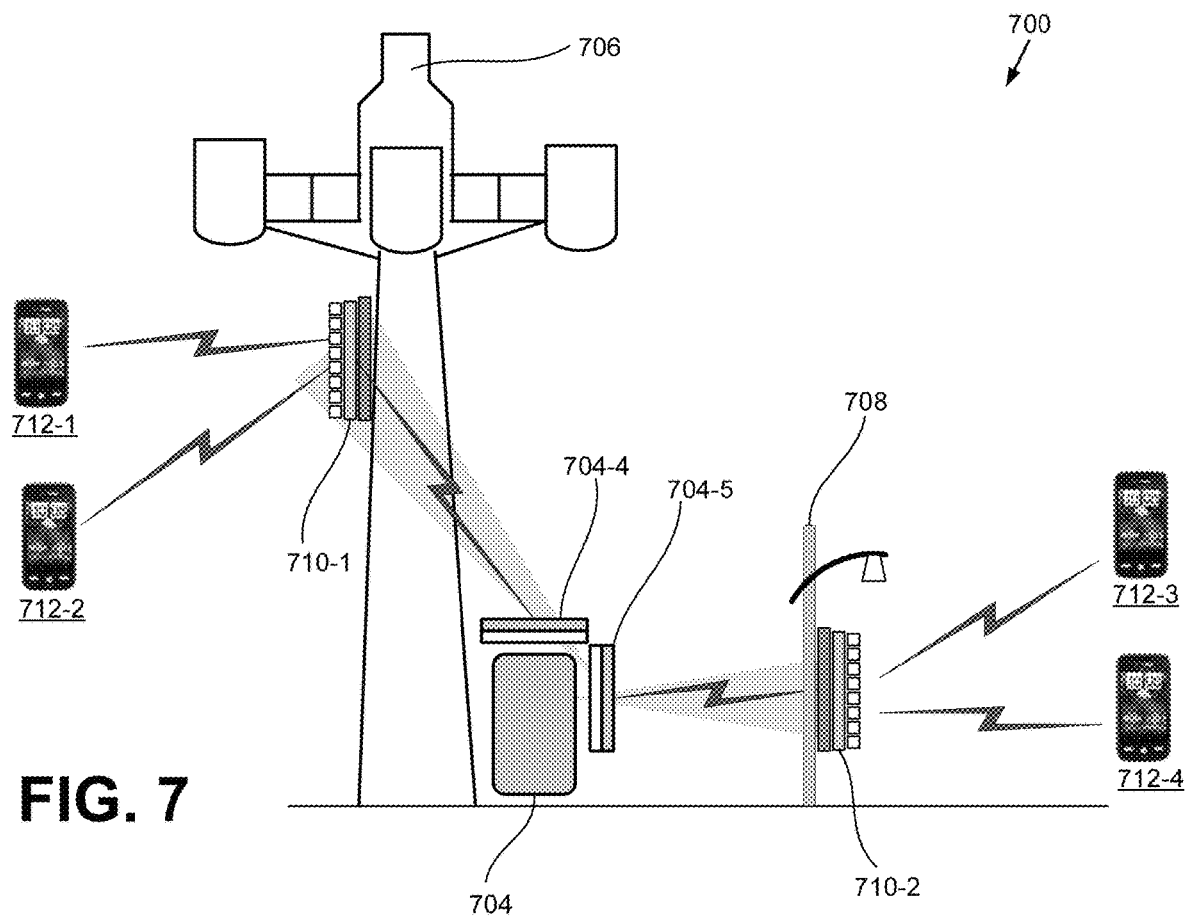
FIGS. 7-9 illustrate exemplary use cases for the OCMPA antenna system of FIG. 2.
Figure 8:
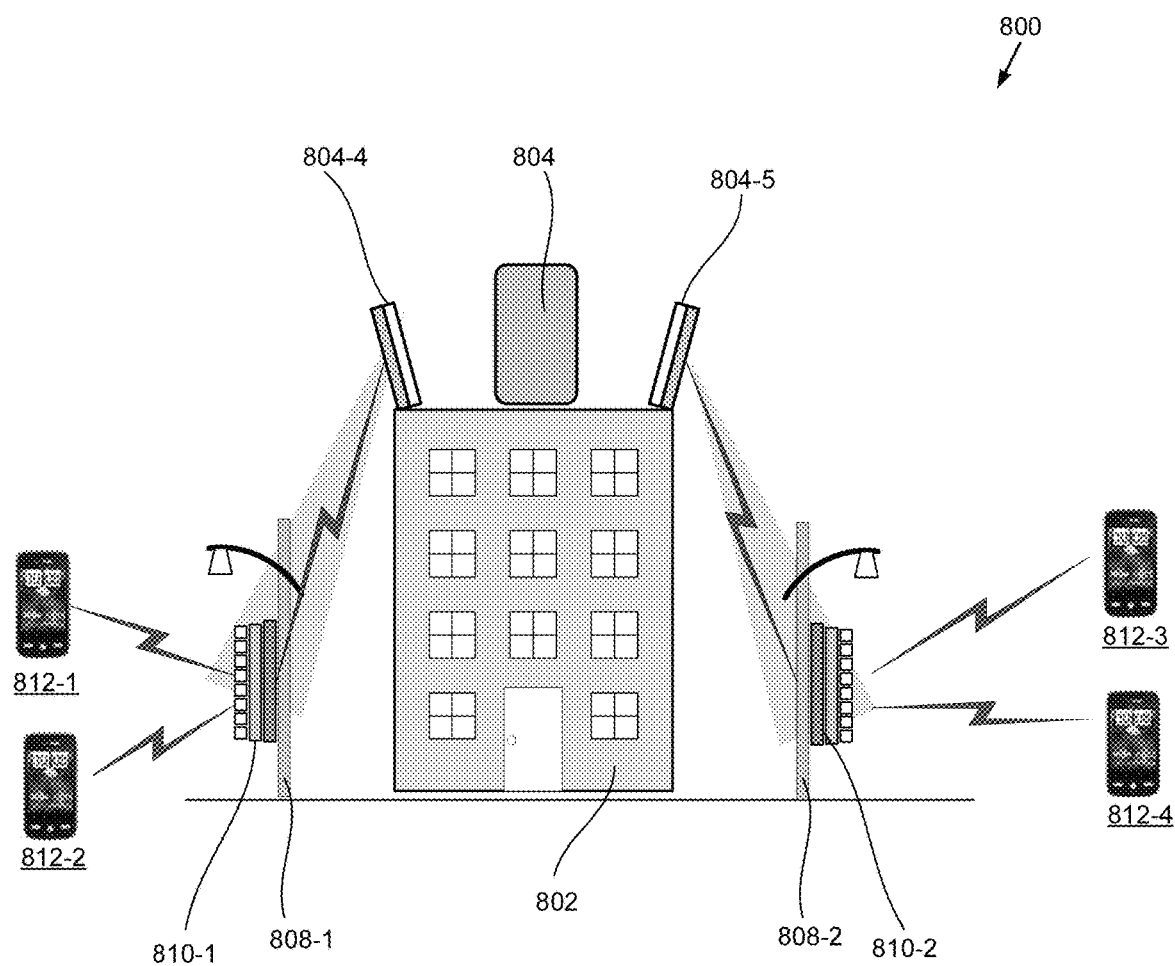
Figure 9:
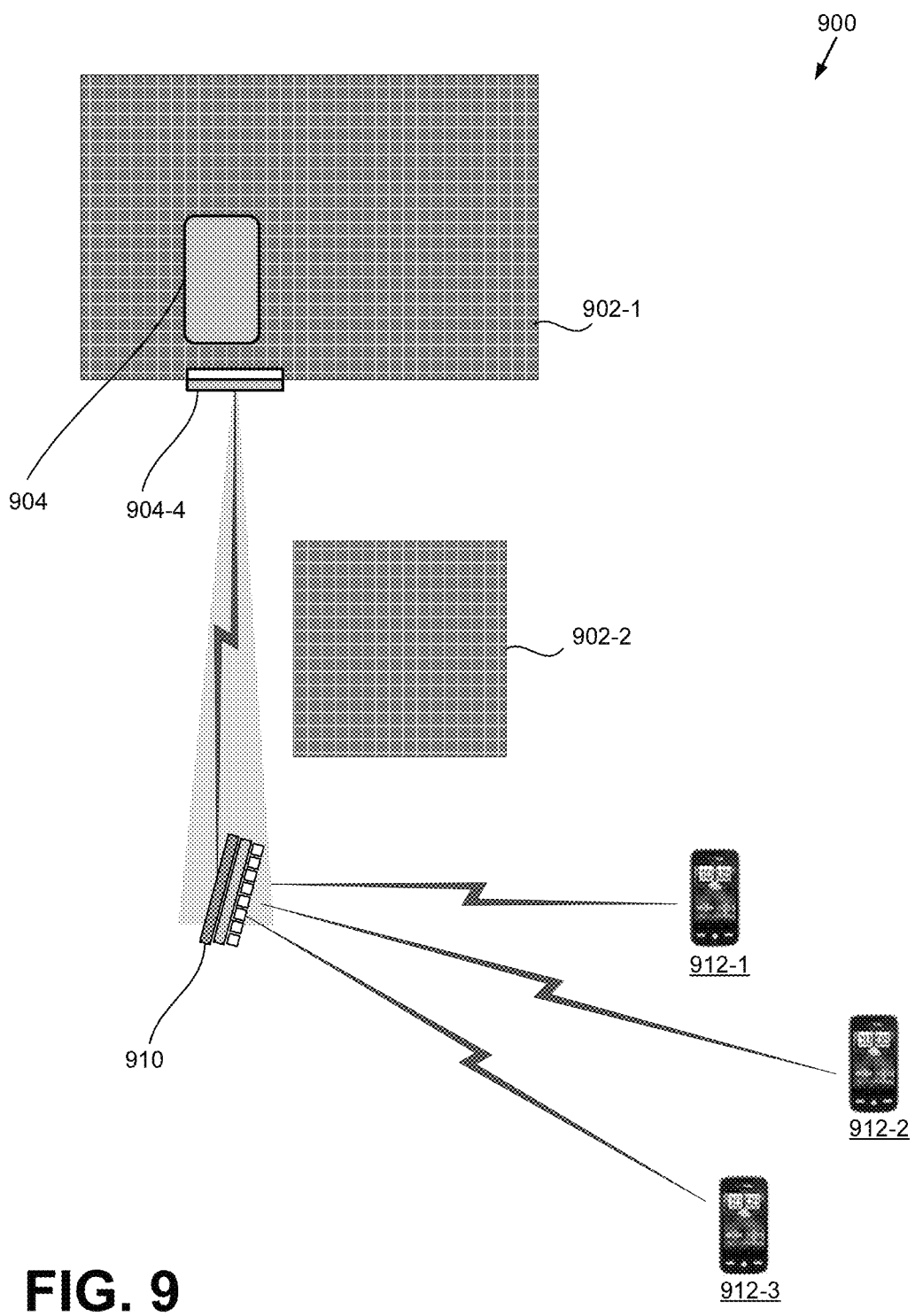

FIGS. 7-9 illustrate other use cases for OCMPA antenna system 200. In FIG. 7, base station 704 is located at the base of a tower 706. This particular configuration may be used, for example, when there is a limited tower space or available weight loading. As further shown, base station 704 may be coupled to not only OCMPA antenna 710-1, but also OCMPA antenna 710-2, which is affixed to a street lamp post. According to one embodiment, base station 704 may include an optical port for each of its feeder antennas 704-4 or 704-5, and base station 704 may select the port corresponding to an OCMPA antenna 710 that steers the RF signal to a particular user device 712. In a different embodiment, base station 704 may include two sets of optical components (e.g., two sets of laser arrays), one for each feeder antenna 704-4 and 704-5. In yet another embodiment, base station 704 may include a mechanism for steering optical control beam 212 to one of many OCMPA antennas 710.

In FIG. 8, base station 804 is located at the rooftop of a building 802. Because of its location, base station 804 may feed a large number of OCMPA antennas, such as antenna 810-1 and 810-2, both of which are affixed to utility poles/lamp posts.

FIG. 9 illustrates a use case in which base station 904 at building 902-1 selects a OCMPA antenna 910 to relay RF signals around a building 902-2. In this embodiment, selecting a particular OCMPA antenna 910 requires knowing the location of user devices 912 as well as the locations of possible obstructions. Optical controller 206 may include additional components (e.g., a computational device) to identify the best OCMPA antenna for the beam steering.

Figure 10:
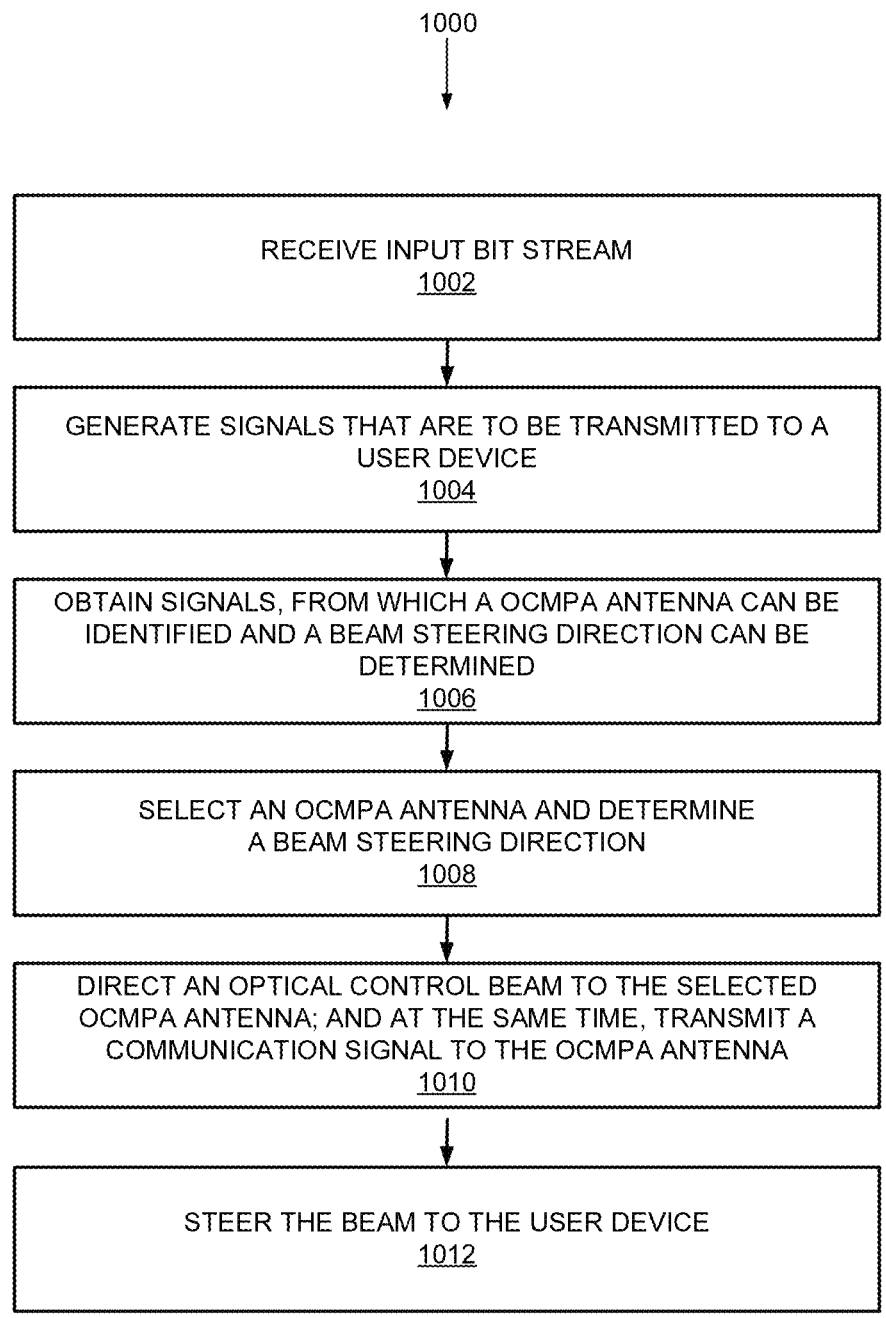
FIG. 10 is a flow diagram of an exemplary process that is associated with the OCMPA antenna system of FIG. 1.

FIG. 10 is a flow diagram of an exemplary process 1000 that is associated with OCMPA antenna system 200. Process 1000 may be performed by one or more components of OCMPA antenna system 200, such as base station 104, OCMPA antenna 110, for example.

Process 1000 may include receiving an input bit stream that is to be transmitted to a user device (block 1002). For example, an OFDM radio 202 or another type of modulator in base station 104 may receive a bit stream that is to be transmitted to user device 112.

Process 1000 may further include generating OFDM signals that are to be modulated and then transmitted to a user device (block 1004). For example, OFDM radio 202 may process the bit stream and generate OFDM signals.

Process 1000 may also include generating signals, from which an OCMPA antenna (which is to receive the generated OFDM signal) can be identified; and from which a beam steering direction can be determined (block 1006). For example, OFDM radio 202 may provide a signal to optical controller 206. Based on the signal, optical controller 206 may identify a specific OCMPA antenna 110 that is to receive the OFDM signal, and the beam steering direction for the identified OCMPA antenna 110.

Process 1000 may further include selecting an OCMPA antenna and determining the direction of beam steering for the selected antenna (block 1008), as well as directing an optical control beam to the selected OCMPA antenna, and at the same time, modulating the generated OFDM signal and transmitting the modulated OFDM signal to the OCMPA antenna (block 1010). For example, optical controller 206 may select an OCMPA antenna 110 for user device 112 and determine the direction of beam steering. Thereafter, optical controller 206 may send (via laser driver 208) optical control beam 212 to OCMPA antenna 110. At the same time that optical controller 206 transmits optical control beam 212 from base station 104, RF transceiver 204 modulates the OFDM signal and transmits the modulated OFDM signal to OCMPA antenna 110. In one embodiment, RF transceiver 204 may transmit the OFDM signal during transmissions of the optical control beam may occur over the same time period. In embodiments where an OCMPA antenna can store (at least temporarily) the directional information conveyed by the optical control beam, RF transceiver 204 may transmit the OFDM signal either during or after the transmission of the optical control beam.

Process 1000 may include steering the modulated OFDM signal to a user device (block 1012). For example, when OCMPA antenna 110 receives optical control beam 212 and the modulated OFDM signal from base station 104, OCMPA antenna 110 may steer the modulated OFDM signal to user device 112 in accordance with the directional information provided by optical control beam 212.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

For example, rather than constructing OCMPA antenna 110 using photodiode-capacitor pairs as phase delay elements, it is possible to use photo-varactor diodes to provide for creating phase delays necessary for beam steering. In another example, OCMPA antenna 110 may be constructed to have two separate panels for a downlink and uplink from/to base station 104. In some implementations, OCMPA antenna 110 may include low power amplifiers, to provide amplification of RF signals in an uplink/downlink signal paths from user device 112 to base station 104.

In yet another example, base station 104 may use RF signals rather than optical signals (e.g., about 80 GHz) to steer beams at deflector antennas. In still yet another example, base station 104 may include a feeder antenna that is itself a phased array antenna, and is capable of directing its control beam to the selected deflector antenna.

In the above, while a series of blocks have been described with regard to the processes illustrated in FIG. 10, the order of the blocks may be modified in other implementations. In addition, non-dependent blocks may represent blocks that can be performed in parallel.

It will be apparent that aspects described herein may be implemented in many, different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A system comprising:
   a phased array antenna that includes:
      a rear panel comprising:
         a first array of phase shift elements; and
         a second array of rear antenna elements;
      a front panel comprising:
         a third array of front antenna elements,
      wherein each of the front antenna elements is electrically coupled to a corresponding one of the rear antenna elements through one of the phase shift elements, and
      wherein when the second array of rear antenna elements receives a radio signal, from a base station external to the phased array antenna, and the first array of phase shift elements receives an optical control beam from the base station, the third array of front antenna elements transmits an output radio signal in a first direction indicated by the optical control beam.

2. The system of claim 1, wherein the phase shift elements include photodiode and capacitor pairs.

3. The system of claim 1, wherein the phase shift elements include:
   photo-varactor diodes.

4. The system of claim 1, wherein the each of the rear panel and front panel is a printed circuit board (PCB).

5. The system of claim 1, wherein each of the rear antenna elements and front antenna elements includes a patch of conducting material.

6. The system of claim 1, wherein each of the rear antenna elements has an electrical contact to one of the phase shift elements.

7. The system of claim 1, wherein the first array of phase shift elements receives t optical control beam from the base station through an optical fiber.

8. The system of claim 7, wherein the wavelength of the received radio signal is less than about 20 millimeters.

9. The system of claim 1, further comprising the base station,
   wherein the base station includes:
      a laser assembly that transmits the optical control beam; and
      a radio frequency (RF) transceiver that transmits the radio signal received by the second array of rear antenna elements.

10. The system of claim 9, wherein the radio signal is an Orthogonal Frequency Division Multiplexed (OFDM) signal modulated over a 5G carrier.

11. The system of claim 10, wherein the base station further includes:
    an OFDM module that receives an input bit stream, processes the bit stream, and outputs feed signals having orthogonal subcarriers to the RF transceiver and outputs optical control signals; and
    an optical controller that receives the optical control signals to control the laser assembly to generate the optical control beam.

12. The system of claim 11, wherein the laser assembly includes an array of lasers, and when the optical controller controls the laser assembly, the optical controller causes the laser assembly to set an intensity of each of laser beams generated by the array of lasers.

13. The system of claim 12, wherein each laser of the array of lasers generates a laser beam at a frequency different from frequencies of laser beams from other lasers in the array of lasers, wherein the laser assembly includes one or more optical multiplexers to combine the laser beams from the array of lasers into a single beam.

14. The system of claim 11, wherein the optical control signals include information for the optical controller to determine a deflection angle for the radio signal to be in the first direction; and wherein the optical controller determines the first direction based on the optical control signals and cause the optical control beam to indicate the first direction to the phased array antenna.

15. The system of claim 11, wherein the optical control signals include information used to select, by the optical controller, the phased array antenna, from a plurality of phased array antennas; and wherein the optical controller directs the optical control beam to the phased array antenna.

16. The system of claim 9, wherein the laser assembly transmits the optical control beam over a first time period that includes a second time period during which the radio signal is transmitted from the RF transceiver.

* * * * *